Dec. 18, 1956 F. P. SHARPE 2,774,426
PIERCING MACHINE
Filed Nov. 30, 1953 4 Sheets-Sheet 1

INVENTOR.
FREDERICK P. SHARPE.
BY

Dec. 18, 1956  F. P. SHARPE  2,774,426
PIERCING MACHINE
Filed Nov. 30, 1953  4 Sheets-Sheet 3
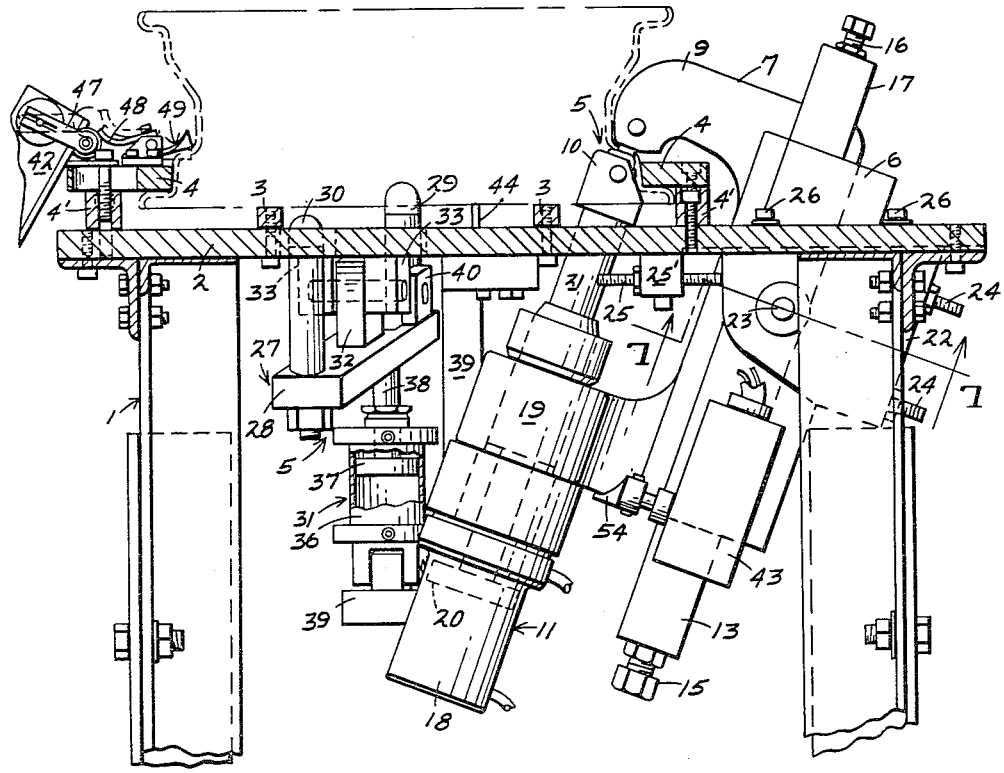
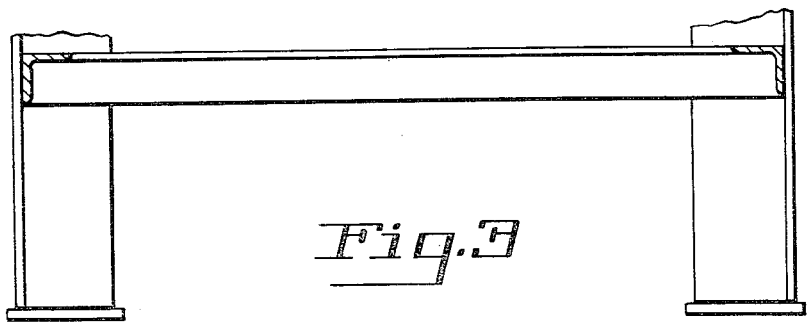
Fig.3
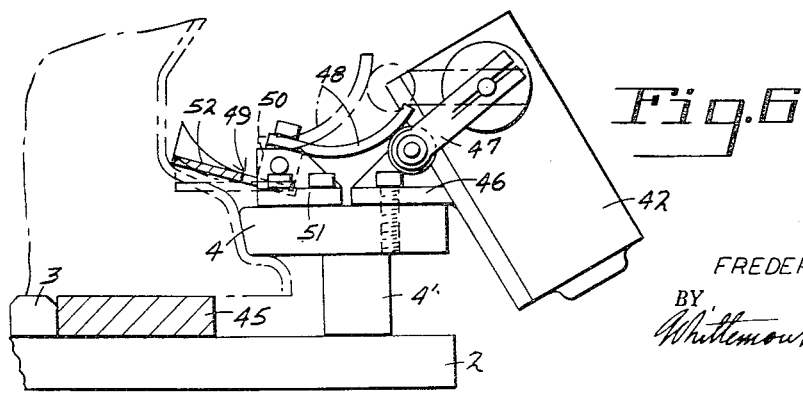
Fig.6
INVENTOR.
FREDERICK P. SHARPE.
BY
Whittemore Hulbert Belknap Dec. 18, 1956    F. P. SHARPE    2,774,426
PIERCING MACHINE
Filed Nov. 30, 1953    4 Sheets-Sheet 4
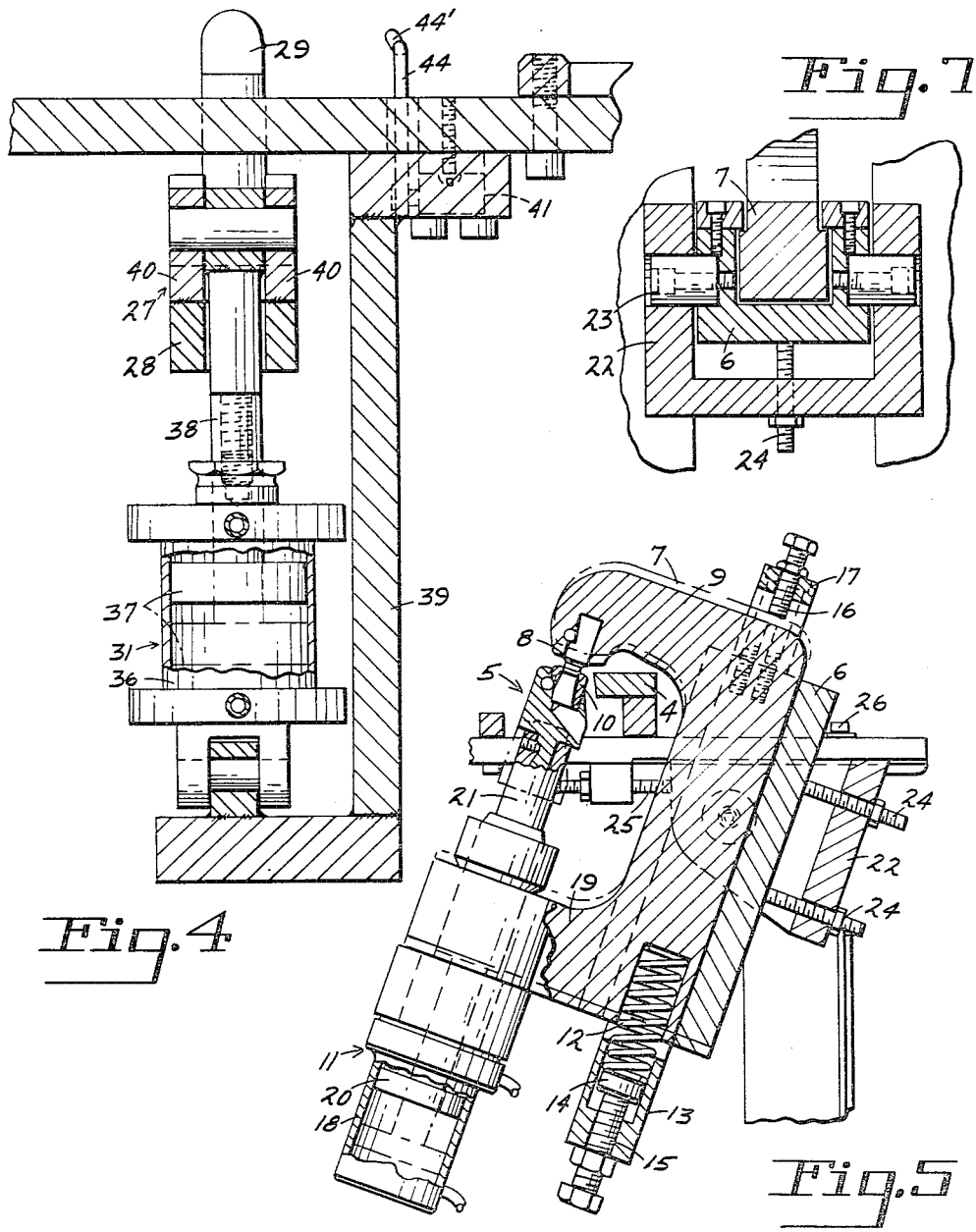
INVENTOR.
FREDERICK P. SHARPE.
BY

United States Patent Office 2,774,426
Patented Dec. 18, 1956

2,774,426

PIERCING MACHINE

Frederick P. Sharpe, Dearborn, Mich., assignor to Kelsey-Hayes Wheel Company, Detroit, Mich., a corporation of Delaware Application November 30, 1953, Serial No. 395,004

5 Claims. (Cl. 164—87)

The invention relates to machines for piercing articles and refers more particularly to machines for piercing tire carrying rims to form valve stem holes.

The invention has for one of its objects to provide an automatic piercing machine which is efficient in operation.

The invention has for another object to provide a piercing machine having a downwardly inclined guide along which the articles are movable by gravity and a stop device for controlling the feed of the articles.

The invention has for a further object to provide a piercing machine having improved means for controlling the operation of the machine.

With these, as well as other objects in view, the invention resides in the novel features of construction and combinations and arrangements of parts, as more fully hereinafter set forth.

In the drawings:

Figure 1 is a top plan view of a piercing machine embodying the invention;

Figures 2, 3, 4, 5 and 6 are cross sections on the lines 2—2, 3—3, 4—4, 5—5 and 6—6, respectively, of Figure 1;

Figure 7 is a cross section on the line 7—7 of Figure 3;

Figure 8 is a schematic wiring diagram.

Figure 1:
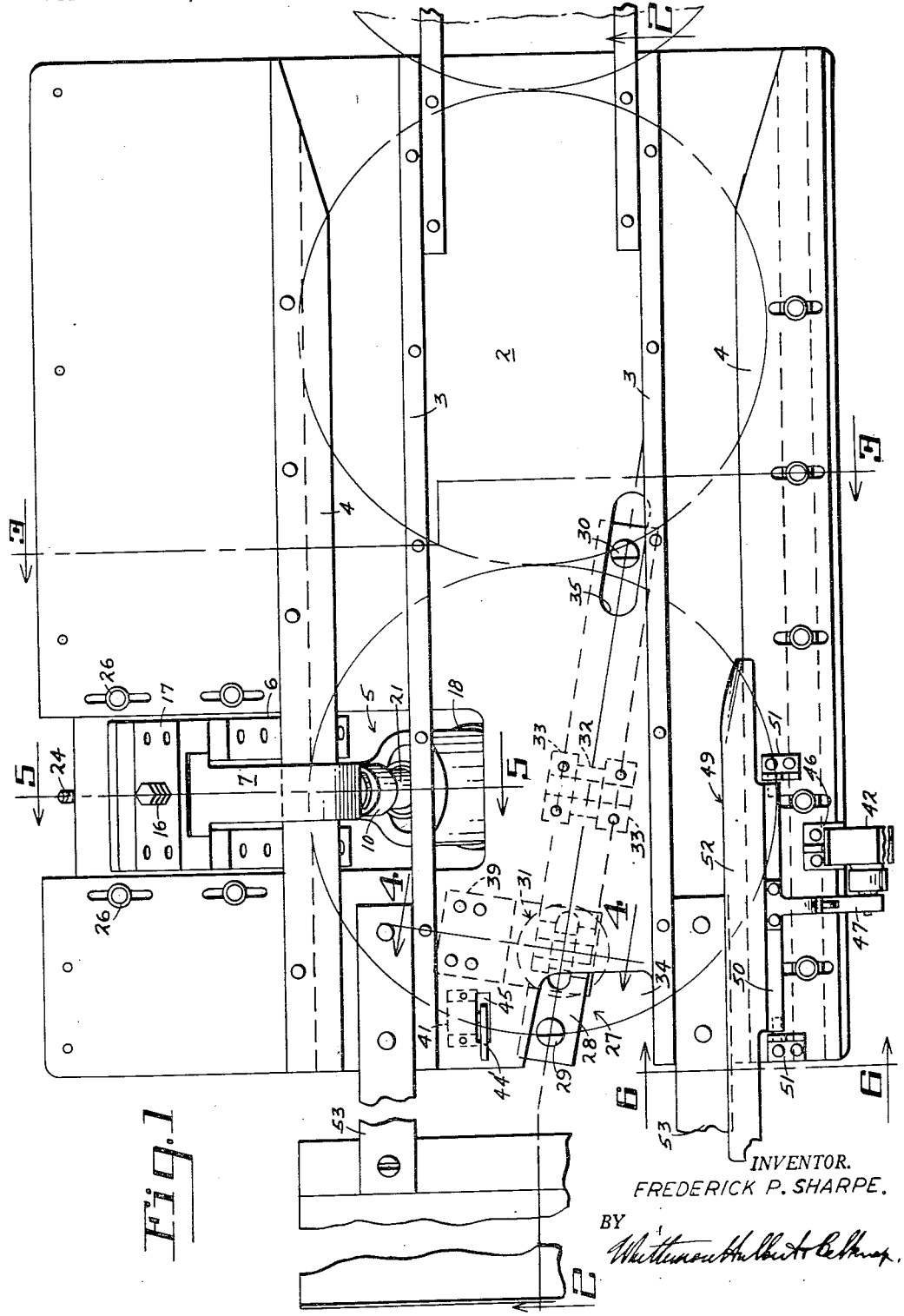
Figure 2:
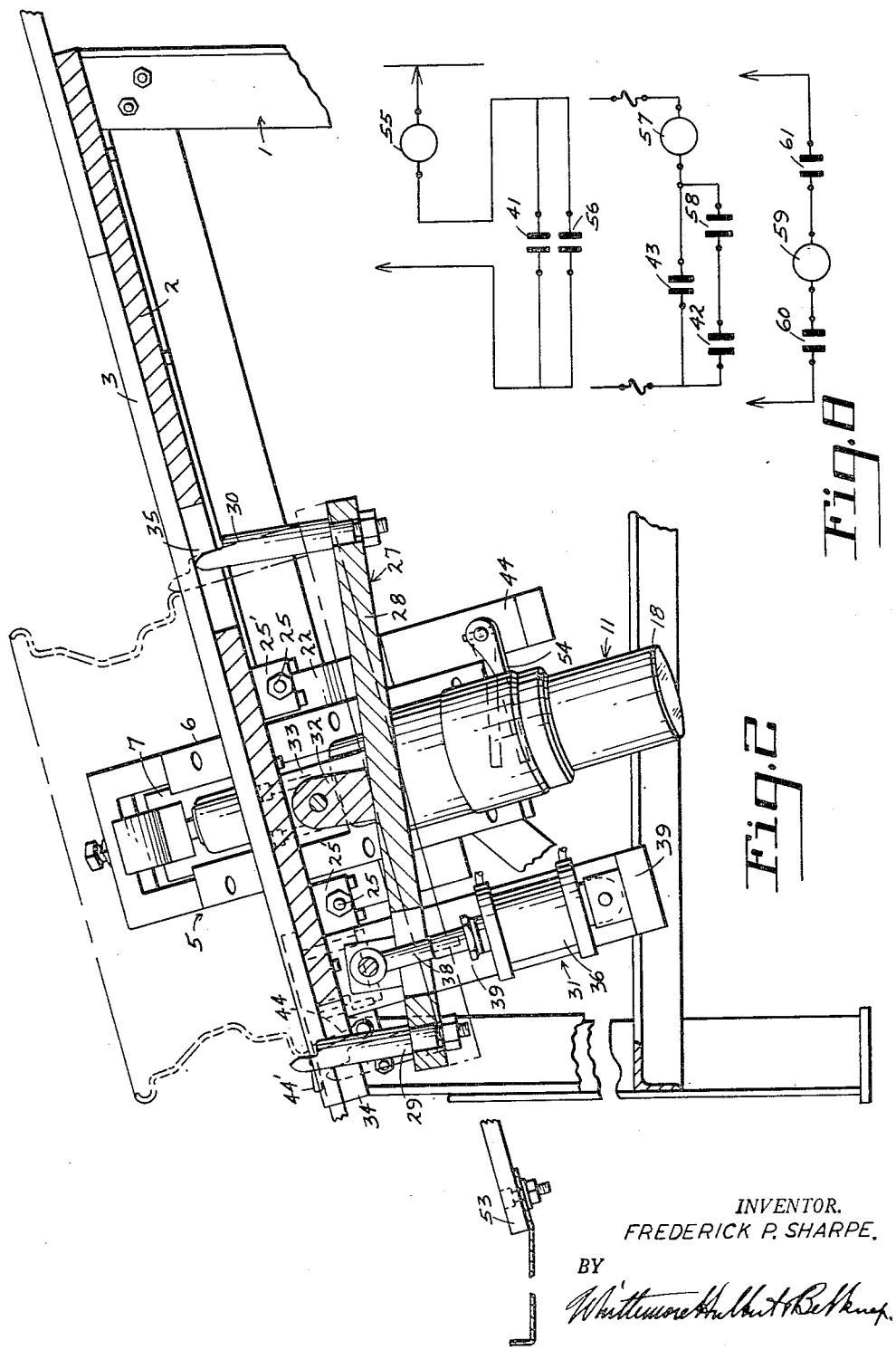

The piercing machine, as illustrated, is designed to pierce tire carrying rims of the drop-center type to form valve stem holes and comprises the frame 1, the downwardly inclined table 2 on the frame and the bars 3 and 4 for supporting and guiding the rims during their downward movement under the influence of gravity. The bars 3 extend longitudinally of and are mounted on the table and are spaced from each other a distance less than the diameter of the rim to engage the lower edges of the lower beads of the rims. The bars 4 also extend longitudinally of the table and are mounted on the spacers 4' which are mounted on the table to clear the rims, the bars 4 being spaced from each other to extend over the lower tire retaining flanges of the rims and to engage the diametrically opposite parts of the adjacent tire bead seats of the rims. Thus, with this construction, the bars 3 and 4 serve to support and guide the rims during their downward movement. One of the bars 4 is preferably laterally adjustably mounted on its spacers 4' to provide for accurately spacing the bars 4 from each other.

For the purpose of piercing the rims, the piercing device 5 is provided. This device comprises the channel-shaped guide 6, the yoke 7 slidable in the guide, the punch 8 secured to the upper arm 9 of the yoke, the anvil 10 in axial alignment with the punch and the hydraulic actuator 11 for relatively moving the punch and anvil toward and away from each other and a rim. The piercing device is mounted on the frame 1 and table 2 at the side of the latter opposite the laterally adjustable bar 4 and near the rear lower end of the table to engage the portion of the lower side wall of the well of the rim laterally opposite the rim axis.

The yoke 7 is resiliently urged upwardly by means of the coil spring 12 which extends into a bore in the yoke and abuts the latter at the end of the bore and which also extends into an axially aligned bore in the fixture 13 and abuts the head 14 in the latter bore. The fixture is secured to the lower end of the guide 6 and to vary the force exerted by the spring the head is adjustable by means of the screw 15 threaded in the fixture and abutting the head. Upward movement of the yoke is limited by the screw 16 threaded in the fixture 17 which is secured to the upper end of the guide 6.

The hydraulic actuator 11 comprises the cylinder 18 fixedly secured to the lower arm 19 of the yoke 7, the piston 20 reciprocable within the cylinder and the piston rod 21 to the lower end of which the piston is secured and to the upper end of which the anvil 10 is secured. Assuming the parts to be in off position with the punch 8 in its uppermost position and the anvil 10 in its lowermost position, upon the entrance of liquid under pressure into the lower end of the cylinder 18 below the piston 20, the piston is raised thereby raising through the piston rod 21 the anvil 10 against the lower side wall of the well of the rim and clamping the lower side wall against the bars 4. Further upward movement of the piston is thus prevented, and the fluid pressure below the piston will thereafter force the cylinder downwardly. The yoke 7, being connected to cylinder 18, is moved downwardly and the punch 8 is forced through the lower side wall of the well, thereby forming the valve stem hole. Then, upon exhaust of the liquid from the lower end of the cylinder 18 and entrance of liquid under pressure into the upper end of the cylinder above the piston 20, the parts are returned to their off positions in which they are held by the coil spring 12.

To accurately locate the punch 8 and anvil 10 to move at right angles to the side wall of the well of the rim, the guide 6 is angularly adjustably mounted on the frame 1 and table 2. In detail, 22 is a channel-shaped bracket secured to the frame and table and 23 are axially aligned gudgeons extending from the side flanges of the bracket and pivotally mounting the guide on the bracket. 24 are set screws threaded in the base of the bracket and abutting the base of the guide above and below the gudgeons for angularly adjusting the guide about the axes of the gudgeons relative to the bracket.

To accurately locate the punch 8 and anvil 10 to engage the side wall of the well of the rim at the desired radial distance from the axis of the rim, I have provided the set screws 25 threaded in the blocks 25' and abutting the bracket 22. The blocks are fixedly secured to the under side of the table 2 and the set screws abut the side flanges of the bracket, the upper portions of these side flanges being adjustably secured to the under side of the table by the bolts 26 which extend through transverse slots in the table.

For the purpose of positioning the rims for engagement by the piercing device 5 and also controlling their downward movement or feed under gravity, I have provided the stop device 27 comprising the rockable lever 28, the rear and front stop pins 29 and 30, respectively, at its lower and upper ends and the fluid pressure operated actuator 31. The lever 28 extends generally longitudinally of and below the table 2 and has the upwardly extending block 32 midway of its ends which is pivotally connected to the spaced blocks 33 secured to the under side of the table. The stop pins 29 and 30 extend upwardly through the slots 34 and 35, respectively, in the table and are adapted to extend above and below the bars 3 to engage and clear the rims. The lever is inclined to the longitudinal axis of the table and the path of downward movement of the rims and has its lower stop pin 29 midway of the guides 3 and 4 and in substantially the path of movement of the axes of the rims and its upper stop pin 30 laterally offset. The rear stop pin when raised or in operative position is engageable with the lowermost portion of the periphery of the lower bead of the lowermost rim and the front stop pin when raised or in operative position extends between the lowermost rim and the next adjacent rim, which rests on the lowermost rim, and is engageable with the periphery of the lower bead of the next adjacent rim upon its downward movement after the lowermost rim is released. The arrangement of the lever 28 and stop pins 29 and 30 is such that when the lever is swung, either stop pin is raised into operative position at substantially the same instant the other stop pin is lowered from operative position out of engagement with its rim. The fluid pressure operated actuator 31 is an air cylinder comprising the cylinder 36, the piston 37 reciprocable in the cylinder and the piston rod 38. The cylinder 36 is pivotally mounted at its lower end on the bracket 39 which is secured to the under side of the table 2. The piston rod 38 extends upwardly through the lever 28 and is pivotally connected to the spaced blocks 40 extending upwardly from and secured to the lever.

To control the operation of the piercing machine, I have provided the limit switches 41, 42 and 43. The switch 41 is of conventional construction and is adapted to be closed by a rim moving downwardly over the table 2. This switch is secured to the under side of the table and has the arm 44 extending upwardly through the slot 45 in the table and provided at its upper end with rearwardly extending portion 44'. The switch is located at the lower end of the table with its arm normally extending above the bars 3 for engagement by the periphery of the lower bead of the lowermost rim during the final portion of its downward movement and just before the rim comes to rest against the lower stop pin 29. When the lowermost rim is in engagement with the lower stop pin, the lower edge of its lower bead engages the rearwardly extending portion of the arm to hold the arm from returning to its normal position.

The switch 42 is of conventional construction and is adapted to be closed by a rim moving downwardly over the table before the rim engages the limit switch 41 and the lower stop pin 29. The switch 42 is located at the side of the table opposite the piercing device 5 and is fixedly mounted on the bracket 46 which, in turn, is fixedly mounted on the laterally adjustably mounted bar 4. The actuating arm 47 of this switch is engageable and adapted to be swung downwardly by the cam 48, which is connected to and adapted to be swung by the lever 49. The cam and lever are secured to the bar 50 which is pivotally mounted at its ends in the brackets 51 which, in turn, are fixedly mounted on the bar 4. The lever 49 has the portion 52 which extends longitudinally of the table laterally inwardly beyond the bar 4 to be engaged and raised by the lower side wall of the well of the rim. The front end of the lever portion 52 is flared upwardly to facilitate movement of the lower side wall of the rim well below the lever portion to swing the same upwardly and thereby swing the cam 48 downwardly to actuate the arm 47 of the switch. The lever portion 52 extends rearwardly beyond the lower end of the table a distance such that the lever is held in its upper position by the lower side wall of the rim well until the lowermost rim has moved off the table on to the supporting bars 53.

The limit switch 43 is of conventional construction and is adapted to be closed by the yoke 7 of the piercing device 5 when the yoke is moved downwardly to accomplish the piercing of the rim by the punch 8. This switch is mounted on the yoke guide 6 and its arm 54 is engageable and swung downwardly by the lower end of the yoke when the latter is lowered to momentarily close the switch after which the arm is allowed to swing upwardly to open the switch when the yoke is raised.

As shown schematically in Figure 8, the limit switch 41 is in a circuit including the relay 55 of a self-cycling hydraulic unit housed in a panel box at the side of the piercing machine. This hydraulic unit is of conventional construction and controls the flow of liquid under pressure to the lower and upper ends of the cylinder 18 of the actuator 11 and the flow of the liquid from these ends. Assuming the parts of the piercing device to be in the off position, this hydraulic unit, when the limit switch 41 is closed, supplies liquid under relative low pressure into the lower end of the cylinder 18 below the piston 20 thereby moving the punch 8 and anvil 10 against opposite sides of the lower side wall of the rim well, and then supplies liquid under high pressure into the lower end of the cylinder thereby moving the punch relative to the anvil to pierce the side wall of the rim well. Then the hydraulic unit supplies liquid under pressure to the upper end of the cylinder 18 above the piston 20 allowing the liquid to flow from the lower end of the cylinder so that the punch and anvil are withdrawn to clear the lower side wall of the rim well. For maintaining the circuit closed, there is the contactor 56 which shunts the limit switch 41.

The limit switch 43 is in a second circuit including the relay 57. Relay 57 has the contactors 56, 58, 60, and 61. For maintaining the second circuit closed, the limit switch 42 and the contactor 58 in series with the switch 42 shunts the switch 43. 59 is a solenoid valve also in the panel box housing the hydraulic unit. This solenoid valve is of conventional construction and controls the flow of compressed air to the upper and lower ends of the cylinder 36 of the actuator 31 and also the exhaust of air from these ends. This solenoid valve and the contactors 60 and 61 at opposite sides thereof are in a third circuit. Valve 59 may be a simple 2 position 4-way valve having a valve element spring-urged to one position and shiftable to the other position by the solenoid when the latter is energized.

In operation, as a rim moves downwardly along the table, it first closes the limit switch 42 and then closes the limit switch 41 just before it comes to rest against the lower stop pin 29. The limit switch 41 closes the circuit to the relay 55 of the hydraulic unit which starts the piercing device 5 and controls its operation. As the yoke of this piercing device is lowered, the limit switch 43 is closed to close the relay 57 and this relay closes the contactors 56, 58, 60 and 61. When the contactors 60 and 61 are closed, the solenoid of solenoid valve 59 is energized shifting the valve element thereof to a position to supply compressed air to the upper end of the cylinder 36 of the actuator 31, thereby rocking the stop device 27 in a counterclockwise direction to lower the lower stop pin 29 out of engagement with the lowermost rim and at the same time raise the upper stop pin 30 to engage the next adjacent rim which is resting against the lowermost rim. The lowermost rim is released after the punch and anvil of the piercing device have been moved to clear the rim so that it can slide off the table and by reason of the contactor 56 shunting the limit switch 41, the opening of this switch does not break the circuit to the relay 55 of the hydraulic unit. The limit switch 43 is of course opened as the yoke of the piercing device is raised to clear the rim following the punching operation. When the lowermost rim becomes disengaged from the lever 49, this lever swings downwardly and moves the cam 48 upwardly to free the arm 47 of the limit switch 42 so that the latter opens, thereby opening the relay 57 and all of the contactors 56, 58, 60 and 61, breaking or opening all of the circuits. When the solenoid of valve 59 is deenergized, the valve element is returned to its original position and supplies compressed air to the lower end of the cylinder 36 and allows the air in the upper end of the cylinder to exhaust, thereby swinging the stop device 27 in a clockwise direction to lower the upper stop pin 30, and raise the lower stop pin 29 to their original positions. As the next adjacent rim, which had been held by the upper stop pin moves downwardly, it again starts the piercing machine on another cycle.

What I claim as my invention is:

1. A machine for piercing rims comprising a guide along which the rims are movable, a device for piercing successive rims, a stop device having stops spaced longitudinally of said guide for alternate engagement with adjacent rims to stop the rims successively in registration with said piercing device, a fluid pressure operated cylinder for operating said stop device, a switch actuated by the successive rims for controlling the operation of said piercing device, a second switch actuated by said piercing device, and a third switch actuated by the successive rims and cooperating with said second switch for controlling the operation of said fluid pressure operated cylinder.

2. A machine for piercing rims comprising a guide along which the rims are movable, a device adjacent to said guide for piercing successive rims, a stop device comprising a lever pivotally mounted intermediate its ends and extending generally longitudinally of said guide and having a stop at each end adapted to lie in the path of movement of the rims, one stop being located for engagement with the forward portion of the forwardmost rim to position the latter rim in registration with said piercing device and the other stop being located for engagement with the rim next adjacent said forwardmost rim, said stops alternately being moved into the path of the rims and being withdrawn therefrom by oscillation of said lever about its pivotal mounting, a switch operated by the rims as they successively move into registration with said piercing device to actuate said piercing device, and means for oscillating said lever to release the forwardmost rim and stop the next adjacent rim in registration with said piercing device including a switch operated by said piercing device.

3. A machine for piercing rims comprising a guide along which the rims are movable, a device adjacent to said guide for piercing successive rims, a stop device comprising a lever pivotally mounted intermediate its ends and extending generally longitudinally of said guide and having a stop at each end adapted to lie in the path of movement of the rims, one stop being located for engagement with the forward portion of the forwardmost rim to position the latter rim in registration with said piercing device and the other stop being located for engagement wtih the rim next adjacent said forwardmost rim, said stops alternately being moved into the path of the rims and being withdrawn therefrom by oscillation of said lever about its pivotal mounting, a switch operated by the rims as they successively move into registration with said piercing device to actuate said piercing device, means for oscillating said lever to release the forwardmost rim and stop the next adjacent rim in registration with said piercing device, a second switch actuated by said piercing device, and a third switch actuated by the successive rims and cooperating with said second switch for controlling operation of said oscillating means.

4. A machine for piercing rims comprising a guide along which the rims are movable, a device adjacent to said guide for piercing successive rims, a stop device comprising a lever pivotally mounted intermediate its ends and extending generally longitudinally of said guide and having a stop at each end adapted to lie in the path of movement of the rims, one stop being located for engagement with the forward portion of the forwardmost rim to position the latter rim in registration with said piercing device and the other stop being located for engagement with the rim next adjacent said forwardmost rim, said stops alternately being moved into the path of the rims and being withdrawn therefrom by oscillation of said lever about its pivotal mounting, a switch operated by the rims as they successively move into registration with said piercing device to actuate said piercing device, means for oscillating said lever to release the forwardmost rim and stop the next adjacent rim in registration with said piercing device, a second switch operated by said piercing device to actuate said oscillating means to swing said lever in one direction to release the forwardmost rim and hold the next adjacent rim against advancement, and a third swtich operated by the forwardmost rim as it moves out of registration with said piercing device following release thereof by said stop device to actuate said oscillating means to swing said lever in the opposite direction to release the next adjacent rim permitting advance thereof and to stop the latter rim in registration with said piercing device.

5. A machine for piercing rims comprising a guide along which the rims are movable, a device for piercing successive rims, a stop device having stops spaced longitudinally of said guide for alternate engagement with adjacent rims to stop the rims successively in registration with said piercing device, means for operating said stop device, a switch actuated by the successive rims for controlling the operation of said piercing device, a second switch actuated by said piercing device, and a third switch actuated by the successive rims and cooperating with said second switch for controlling the operation of said means.

References Cited in the file of this patent

UNITED STATES PATENTS

| | | |
|---|---|---|
| 946,584 | Smith | Jan. 18, 1910 |
| 1,186,665 | Kucera | June 13, 1916 |
| 1,209,217 | Small | Dec. 19, 1916 |
| 1,369,921 | Erhard | Mar. 1, 1921 |
| 1,759,344 | Chessman | May 20, 1930 |
| 1,784,131 | Cabot | Dec. 9, 1930 |
| 1,934,303 | Greiner | Nov. 7, 1933 |
| 2,021,584 | Wickman | Nov. 19, 1935 |
| 2,078,706 | Boker | Apr. 27, 1937 |
| 2,209,407 | Lindsay et al. | July 30, 1940 |
| 2,326,588 | Wales | Aug. 10, 1943 |
| 2,371,358 | Sckella | Mar. 13, 1945 |
| 2,394,956 | Weber | Feb. 12, 1946 |
| 2,607,421 | Anderson | Aug. 19, 1952 |